United States Patent
Archambault et al.

(10) Patent No.: US 8,458,679 B2
(45) Date of Patent: Jun. 4, 2013

(54) MAY-CONSTANT PROPAGATION

(75) Inventors: Roch G. Archambault, North York (CA); Shimin Cui, Toronto (CA); Yaoqing Gao, North York (CA)

(73) Assignee: International Business Machines Corporation, Armonk, NY (US)

(*) Notice: Subject to any disclaimer, the term of this patent is extended or adjusted under 35 U.S.C. 154(b) by 303 days.

(21) Appl. No.: 12/888,230

(22) Filed: Sep. 22, 2010

(65) Prior Publication Data

US 2011/0072419 A1   Mar. 24, 2011

(30) Foreign Application Priority Data

Sep. 22, 2009   (CA) ..................................... 2684441

(51) Int. Cl.
*G06F 9/45*   (2006.01)

(52) U.S. Cl.
USPC ........................................................ 717/146

(58) Field of Classification Search
None
See application file for complete search history.

(56) References Cited

U.S. PATENT DOCUMENTS

| | | | |
|---|---|---|---|
| 5,671,419 A | 9/1997 | Carini et al. | |
| 6,031,994 A | 2/2000 | Radigan | |
| 6,848,099 B2 | 1/2005 | Harrison, III et al. | |
| 8,196,127 B2* | 6/2012 | Gschwind ...................... | 717/154 |
| 2004/0015918 A1* | 1/2004 | Kawahito et al. .............. | 717/151 |
| 2007/0277162 A1* | 11/2007 | Tanaka et al. ................... | 717/140 |
| 2011/0119660 A1* | 5/2011 | Tanaka ........................... | 717/149 |

OTHER PUBLICATIONS

Boogerd, Cathal et al., "On the Use of Data Flow Analysis in Static Profiling", *Source Code Analysis and Manipulation, 2008 Eighth IEEE International Working Conference* Sep. 28-29, 2008, 10 pages.
Brumley, David et al., "BitScope: Automatically Dissecting Malicious Binaries", Mar. 18, 2007, 20 pages.
Click, Cliff et al., "Combining Analyses, Combining Optimizations", *ACM Transactions on Programming Languages and Systems* vol. 17, Issue 2, http://www-plan.cs.colorado.edu/diwan/7135-08/papers/click.pdf Mar. 1995, pp. 181-196.
Muller-Olm, Markus et al., "On the Complexity of Constant Propagation", *Lecture Notes in Computer Science; vol. 2028 Proceedings of the 10th European Symposium on Programming Languages and Systems* Apr. 2001, pp. 190-205.
Muller-Olm, Markus, "The Complexity of Copy Constant Detection in Parallel Programs", Feb. 2001, pp. 490-501.
Muth, Robert et al., "Code Specialization based on Value Profiles", *Lecture Notes in Computer Science; vol. 1824 Proceedings of the 7th International Symposium on Static Anaysis* Jun. 2000, 20 pages.
Olmos, Karina et al., "Strategies for Source-to-Source Constant Propagation", Oct. 2002, 22 pages.

(Continued)

*Primary Examiner* — Philip Wang
(74) *Attorney, Agent, or Firm* — DeLizio Gilliam, PLLC (57) ABSTRACT

May-constant propagation is a technique used to propagate a constant through the call graph and control flow graph by ignoring possible kills and re-definitions with low probability. Variables associated with constants in program code are determined. Execution flow probabilities are executed for code segments of the program code that comprise the variables. The execution flow probabilities are calculated based on flow data for the program code. At least a first of the code segments is determined to have a high execution flow probability. The first of the constants associated with the first variable are propagated through the flow data to generate modified flow data.

19 Claims, 10 Drawing Sheets

OTHER PUBLICATIONS

Patterson, Jason R., "Accurate Static Branch Prediction by Value Range Propagation", *Proceedings of the ACM SIGPLAN 1995 conference on Programming language design and implementation* Jun. 1995, 12 pages.

Wegman, Mark N. et al., "Constant Propagation with Conditional Branches", *ACM Transactions on Programming Languages and Systems* vol. 13, Issue 2, http://www.cs.uiuc.edu/class/fa07/cs426/Papers/sccp.toplas91.pdf Apr. 1991, pp. 181-210.

Wirthlin, Michael J. et al., "Improving Functional Density Through Run-Time Constant Propagation", *Proceedings of the 1997 ACM fifth international symposium on Field-programmable gate arrays* Feb. 1997, 7 pages.

* cited by examiner

FIG. 1

```
FOO:
BAK_RTD_11 = D-T41
D-T41%BOUNDS%LBOUND(3) = 1
D-T41%BOUNDS%EXTENT(3) = 31
D-T41%BOUNDS%MULT(3) = 8
D-T41%BOUNDS%LBOUND(2) = 1
D-T41%BOUNDS%EXTENT(2) = MAX0(T7, 0)
D-T41%BOUNDS%MULT(2) = 248
D-T41%BOUNDS%LBOUND(1) = 1
D-T41%BOUNDS%EXTENT(1) = MAX0(T6, 0)
D-T41%BOUNDS%MULT(1) = (MAX0(T7, 0) * 248)
D-T41%RVO = -((((D-T41%BOUNDS%LBOUND(1) * ((MAX0(T7, 0) * 248))) + (D-
T41%BOUNDS%LBOUND(2) * 248)) + (D-T41%BOUNDS%LBOUND(3) * 8)))
RETC_10 = 0
IF ((((D-T41%FLAGS .AND. 128)) .NE. 0)) THEN  // IF T41 IS ALREADY ALLOCATED
    RETC_10 = 2
    D-T41 = BAK_RTD_11
ELSE
    IF (((MAX0(T6, 0) * ((MAX0(T7, 0) * 248))) == 0)) THEN
        D-T41%ADDR = ADDR(0)
        D-T41%FLAGS = 240
    ELSE
        D-T41%ADDR = __MALLOC((MAX0(T6, 0) * ((MAX0(T7, 0) * 248))))  // IF T41 IS
NOT ALLOCATED, ALLOCATE IT
        IF ((D-T41%ADDR == ADDR(0))) THEN
            RETC_10 = 1
            D-T41 = BAK_RTD_11
        ELSE
            D-T41%FLAGS = 240
        END IF
    END IF
END IF
FOOL (&T6,&T5,&T7,&T8,&T9,D-T10%ADDR,D-T11%ADDR,D-T14%ADDR,D-
T41%ADDR,&T4,D-T12%ADDR,D-T15%ADDR)
```

MAY-CONSTANT PROPAGATION

STATEMENT OF GOVERNMENT RIGHTS

This invention was made with Government support under Contract number HR0011-07-9-0002 awarded by the Defense Advanced Research Projects Agency (DARPA). The Government has certain rights in this invention.

RELATED APPLICATIONS

This application claims the priority benefit of Canadian Application No. 2684441 filed Sep. 22, 2009.

BACKGROUND

This disclosure relates generally to propagation of constants in data processing systems and more specifically to propagation of may-constants in data processing systems.

In a data processing system environment, programming languages typically provide a mechanism for the propagation of constants as used within computer executable program code. Constants that are assigned to a variable can be propagated through data structures built in memory. Typical data structures include examples such as a call graph and a control flow graph. The propagated constant is substituted at the instance or location of use of the variable.

The existing technique of constant propagation can be used to trigger the removal of dead code. Constant propagation, in addition, can be used to perform partial evaluation of code segments at compile time.

SUMMARY

Embodiments of the inventive subject matter include a method for propagating may-constants in program code input to a compiler. Variables associated with a set of one or more constants in the program code are determined. Execution flow probabilities are executed for a set of one or more code segments of the program code that comprise the variables. The execution flow probabilities are calculated based, at least in part, on flow data for the program code. It is then determined that at least a first code segment of the set of one or more code segments has a first of the execution flow probabilities that is high. The first code segment at least comprises a first variable of the variables. Those of the set of one or more constants associated with the first variable are propagated through the flow data to generate modified flow data based, at least in part, on determining that at least the first code segment of the set of one or more code segments has a first of the execution flow probabilities that is high.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. In some instances, well-known instruction instances, protocols, structures and techniques have not been shown in detail in order not to obfuscate the description.

Although an illustrative implementation of one or more embodiments is provided below, the disclosed systems and methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure is described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions.

Typical existing constant propagation algorithms cannot handle cases such as either intra-procedure or inter-procedure propagation of may-constants in which the variable in use has an unknown value but may have constant values with high probability. For example, with reference to FIG. 1, a textual representation of an intra-procedure may-constant propagation of a variable of an unknown value is presented. Code snippet 100 represents a portion of computer executable program code or instructions of an intra-procedure may-constant propagation. Statement 102 in a first condition assigns a value of variable "x" equal to "3." Statement 104 representing a "else" portion of the first condition, assigns the variable "x" equal to another variable "w" that is unknown. Statement 106 further assigns variable "x" to another variable "z" that is also unknown. Statement 108 represents the use of variable "x," however, the value of "x=w" and the value of "x=z" are unknown and cannot be substituted with a propagated constant.

Figure 1:
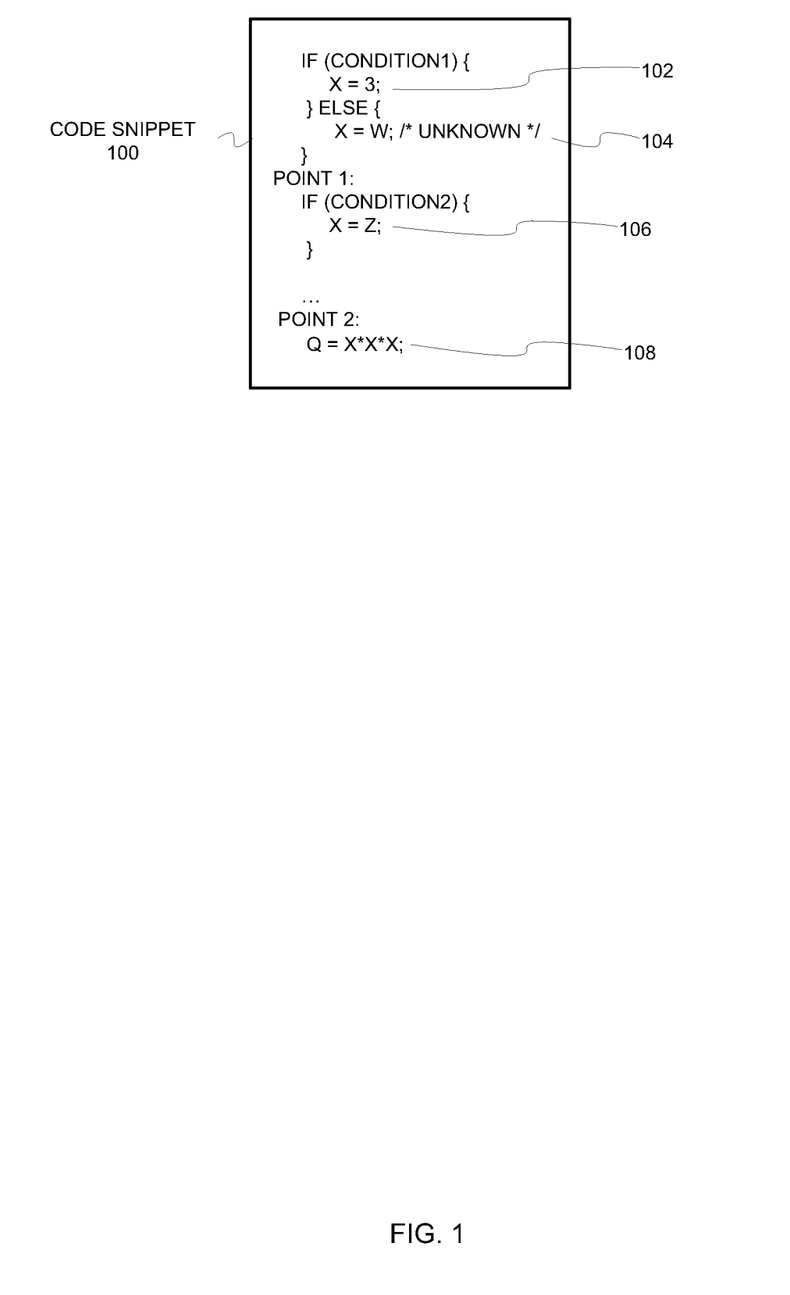
FIG. 1 is an illustrative representation of a typical intra-procedure may-constant propagation.

May-constant propagation is a technique used to propagate a constant through the call graph and control flow graph by ignoring possible kills and re-definitions with low probability. Using a technique of static analysis and dynamic profiling in the example provided, a first determination may provide a probability of 50 percent for variable "x" being assigned "w" while a probability of variable "x" being assigned "z" may be reduced to 25 percent. However, when the probability of "x=w" and "x=z" is determined to be low, variable "x" at statement 108 may have a constant value of "3" with high probability based on the conditions. Since it is a may-constant, compile time folding may not be done, but code versioning with the inserted runtime check can be used to specialize the code for partial evaluation at compile-time. For example, "q=x*x*x" at statement 108 can be replaced by the following code: "if (x==3) {q=27;} else {q=x*x*x;}".

Figure 2:
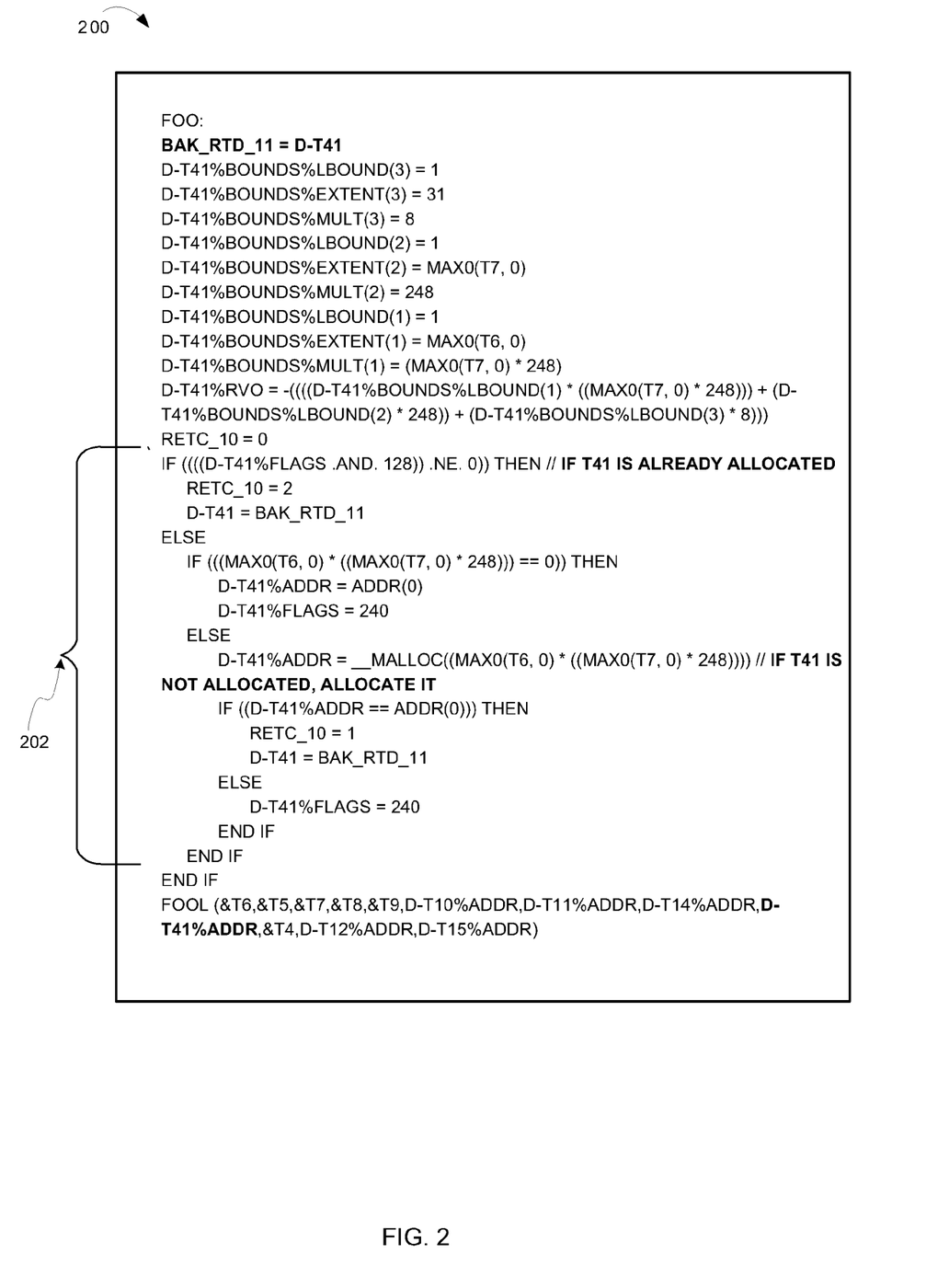
FIG. 2 is an illustrative representation of a typical inter-procedure may-constant propagation.

With reference to FIG. 2, a textual representation of an inter-procedure may-constant propagation is presented. Domain or programming language specific information can be used to identify what may-constants should be traced and what kills and re-definitions can be ignored. Code snippet 200 is a code portion comprising a Fortran programming language example. Since an assumed-shape array is rarely relocated or the allocation through memory allocation routine malloc rarely fails, the constants for an array descriptor such as ref d-t41% can be propagated within a procedure and across procedures. Code snippet 200 represents a portion of computer executable program code or instructions that may be used in an inter-procedure may-constant propagation. The example code snippet is for an assumed shape array. The assumed shape array is an array that has an unknown shape, but the shape is determined by the actual arguments presented.

Statements 202 represents statements associated with the actual allocation of the assumed shape array according to the definitions of the previous statements of code snippet 200. Through static analysis or dynamic profiling, statements 202 may be shown to have a low probability of being executed. Therefore there is a requirement to provide a more predictable form of may-constant propagation to address scenarios in which variables are unknown.

Figure 3:
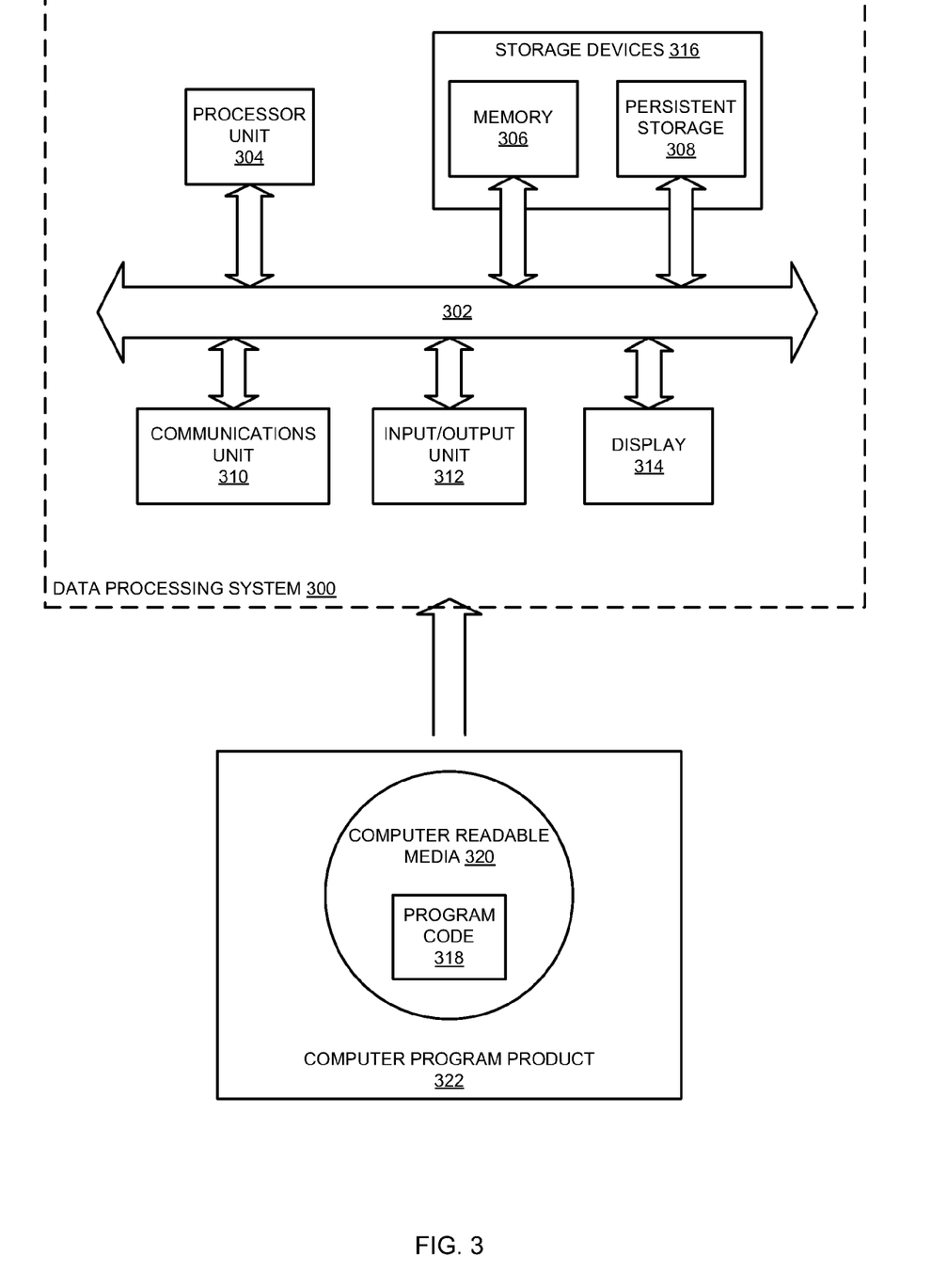
FIG. 3 is a block diagram of an exemplary data processing system operable for various embodiments of the disclosure.

Turning now to FIG. 3, a block diagram of an exemplary data processing system operable for various embodiments of the disclosure is presented. In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices 316. A storage device is any piece of hardware that is capable of storing information, such as, for example without limitation, data, program code in functional form, and/or other suitable information either on a temporary basis and/or a permanent basis. Memory 306, in these examples, may be, for example, a random access memory or any other suitable volatile or non-volatile storage device. Persistent storage 308 may take various forms depending on the particular implementation. For example, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communications links.

Input/output unit 312 allows for input and output of data with other devices that may be connected to data processing system 300. For example, input/output unit 312 may provide a connection for user input through a keyboard, a mouse, and/or some other suitable input device. Further, input/output unit 312 may send output to a printer. Display 314 provides a mechanism to display information to a user.

Instructions for the operating system, applications and/or programs may be located in storage devices 316, which are in communication with processor unit 304 through communications fabric 302. In these illustrative examples the instructions are in a functional form on persistent storage 308. These instructions may be loaded into memory 306 for execution by processor unit 304. The processes of the different embodiments may be performed by processor unit 304 using computer-implemented instructions, which may be located in a memory, such as memory 306.

These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 318 is located in a functional form on computer readable media 320 that is selectively removable and may be loaded onto or transferred to data processing system 300 for execution by processor unit 304. Program code 318 and computer readable media 320 form computer program product 322 in these examples. In one example, computer readable media 320 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, computer readable media 320 also may take the form of a persistent storage, such as a hard drive, a thumb drive, or a flash memory that is connected to data processing system 300. The tangible form of computer readable media 320 is also referred to as computer recordable storage media. In some instances, computer readable media 320 may not be removable.

Alternatively, program code 318 may be transferred to data processing system 100 from computer readable media 320 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

In some illustrative embodiments, program code 318 may be downloaded over a network to persistent storage 308 from another device or data processing system for use within data processing system 300. For instance, program code stored in a computer readable storage medium in a server data processing system may be downloaded over a network from the server to data processing system 300. The data processing system providing program code 318 may be a server computer, a client computer, or some other device capable of storing and transmitting program code 318.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 300 may be any hardware apparatus that may store data. Memory 306, persistent storage 308 and computer readable media 320 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system.

A data processing system suitable for storing or executing program code can include a processor coupled directly or indirectly to memory elements through a system bus. The memory elements can include local memory employed during actual execution of the program code. The memory elements can also include bulk storage, and cache memories, which provide temporary storage of at least some program code in order to reduce the number of times code is retrieved from bulk storage during execution.

Network adapters may also be coupled to the system to enable the data processing system to become coupled to other data processing systems, remote printers, or storage devices through intervening private or public networks. Modems, cable modems, and ethernet cards are just a few of the currently available types of network adapters.

According to an illustrative embodiment, a computer-implemented process for propagation of may-constants is presented. In one example using data processing system 300 of FIG. 3 the computer-implemented process obtains a source code from storage devices 316, communications unit 310, input/output unit 312 or display 314. Processor unit 304 generates a set of associated data structures from the source code, and a set of may-constant data structures, identifies a candidate code for may-constant propagation to form identified candidate code and updates the set of may-constant data structures contained in memory 306. Processor unit 304 further selects an identified candidate code using information in the may-constant data structures, including a probability, to form a selected candidate code, identifies a code region associated with the selected candidate code to form an identified code region; and modifying the identified code region including the selected candidate code.

In an alternative embodiment, program code 318 containing the computer-implemented process may be stored within computer readable media 320 as computer program product 322. In another illustrative embodiment, the computer-implemented process for propagation of may-constants is presented in an apparatus. The processor unit of the apparatus executes the computer executable program code to direct the apparatus to perform the process.

Figure 4:
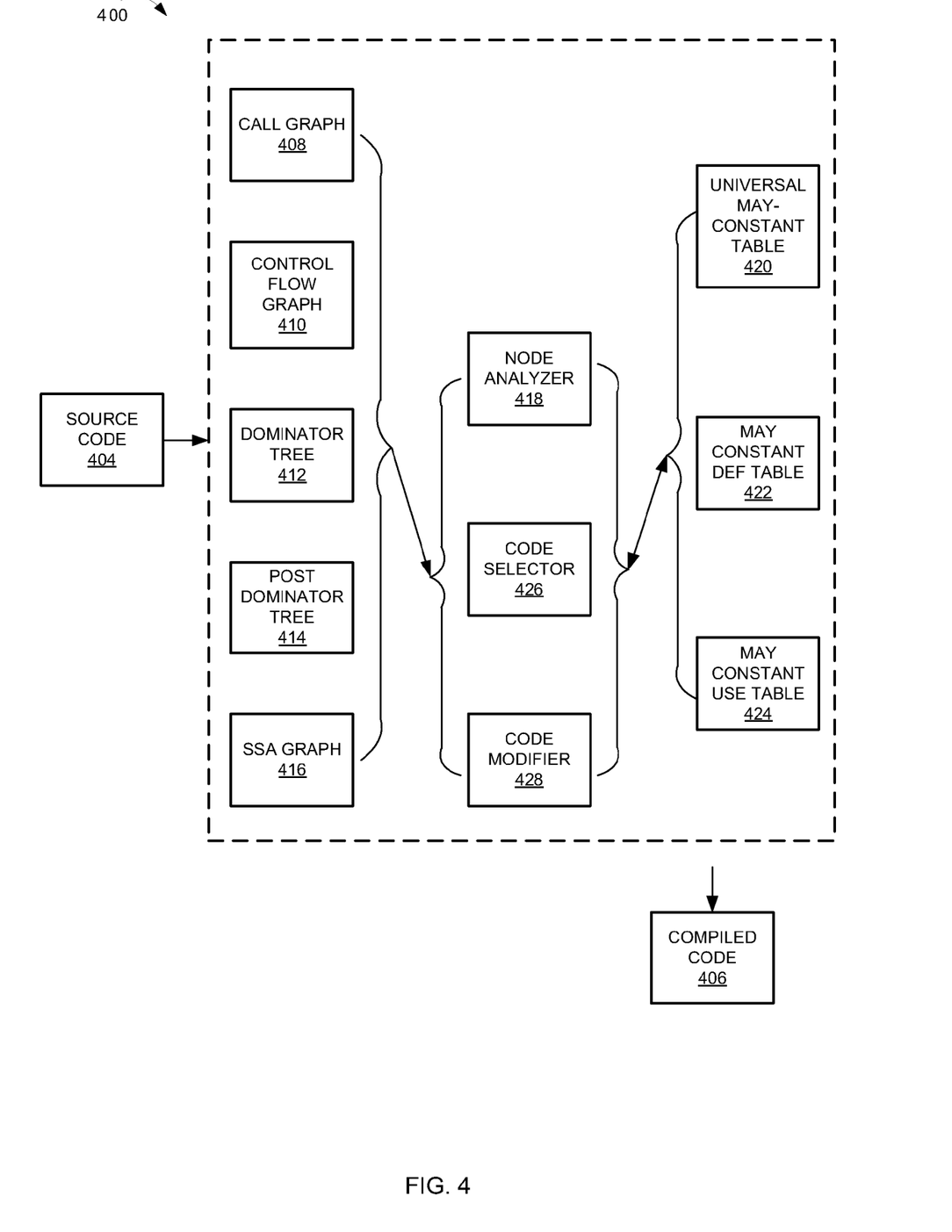
FIG. 4 is a block diagram of a compilation system that may be implemented within the data processing system of FIG. 3, in accordance with various embodiments of the disclosure.

With reference to FIG. 4, a block diagram of a compilation system that may be implemented within the data processing system of FIG. 3, in accordance with various embodiments of the disclosure is presented. Compilation system 400 is an example of a compilation system for propagation of may-constants comprising compiler 402, input in the form of source code 404 and output in the form of compiled code 406.

Compiler 402 is further composed of a number of components comprising data structures representing call graph 408, control flow graph 410, dominator tree 412, post dominator tree 414, static single assignment (SSA) graph 416, node analyzer 418, universal may-constant table 420, may-constant def table 422, may-constant use table 424, code selector 426 and code modifier 428. A first set of the data structures call graph 408, control flow graph 410, dominator tree 412, post dominator tree 414, static single assignment (SSA) graph 416 are created by compiler 402 from the input of source code 404 and further processed during phases of compilation. Representations of these forms are well known to those skilled in the art.

Additional data structures of universal may-constant table 420, may-constant def table 422, may-constant use table 424 are used by node analyzer 418 of compiler 402 when analyzing the data created during generation of the first set of data structures. Code selector 426 further processes the results of node analyzer 418 to determine and identify candidate code. The candidate code may be complete procedures or programs or code portions thereof. Code modifier 428 performs modifications including code versioning or cloning type transformations as needed on the identified candidate code.

Compiler 402 performs three basic operations with regard to may-constant propagation. An initial data collection and analysis phase is representative of node analyzer 418. Code selector 426 represents a candidate code selection phase and code modifier 428 represents a code transformation phase. Although shown as separate phases, an implementation may choose to collect the operations into one or more units without change to the overall functional capability.

Universal may-constant table 420 consists of a set of one or more entries. Each global or universal may-constant table entry contains information including function id, argument position, constant kind, such as a value parameter, reference parameter, or global variable, constant value with offset, probability, and call graph edge index. The content of universal may-constant table 420 represents characteristics including constant information, of a program or code portion and provides a global perspective with respect to variables and values of the program.

May-constant def table 422 contains a set of one or more entries. Each may-constant def table entry contains information including information of a static single assignment (SSA) def node, constant value with offset, basic block index, and probability. A probability is associated with a constant value. May-constant def table 422 comprises entries describing function parameters of the functions comprising the code portions being analyzed. The def tables typically include assignments.

May-constant use table 424 also contains a set of one or more entries. Each may-constant use table entry contains information including the information of the static single assignment (SSA) use node. The entries comprise information regarding arguments for the functions of the code being analyzed. The use tables typically include references.

While the examples describe use of tables for the additional data structures of universal may-constant table 420, may-constant def table 422, may-constant use table 424, the data structures of the examples are not limited to tabular formats and may be implemented in other forms including arrays, lists, and linked lists.

The probability values, contained with entries of universal may-constant table 420 and may-constant def table 422, are based on conditions similar to those involved in branch predictions. Probability assignment may be made on speculation that an execution flow may occur. For example, an initial probability may be 50 percent that one of two branches will be taken. In a next iteration, conditions may have changed to reduce the probability to 25 percent. The resulting calculated probability may then be viewed as the product of the two choices, yielding a probability of slightly more than 10 percent. Probability may be determined based on instrumentation of the code as when profiling code and performing execution tracing. This activity may be fairly precise, but the overhead is usually significant and therefore reduces the capability to measure many variables.

Probability values within the tables provide an additional measure of confidence when selecting a may-constant as a candidate for propagation. For example, may-constants may be ranked according to probability to aid in the selection process. Importance of a candidate may be directly related to the probability value assigned. Therefore code segments containing may-constants with low probability can be ignored while focusing on more important high probability entries.

Enhancements to compiler 402 enable may-constant propagation to optimize application performance by propagating a high-probability constant through the call graph (inter procedure) and control flow graph (intra procedure). Ignoring possible kills and re-definitions with low probability propagates the high-probability constant. A combination of static analysis, dynamic profiling information, and language and domain specific information may be used. The may-constant information collected guides compiler 402 to perform code transformation or modification including code versioning and cloning to specialize the code for better performance.

Figure 5:
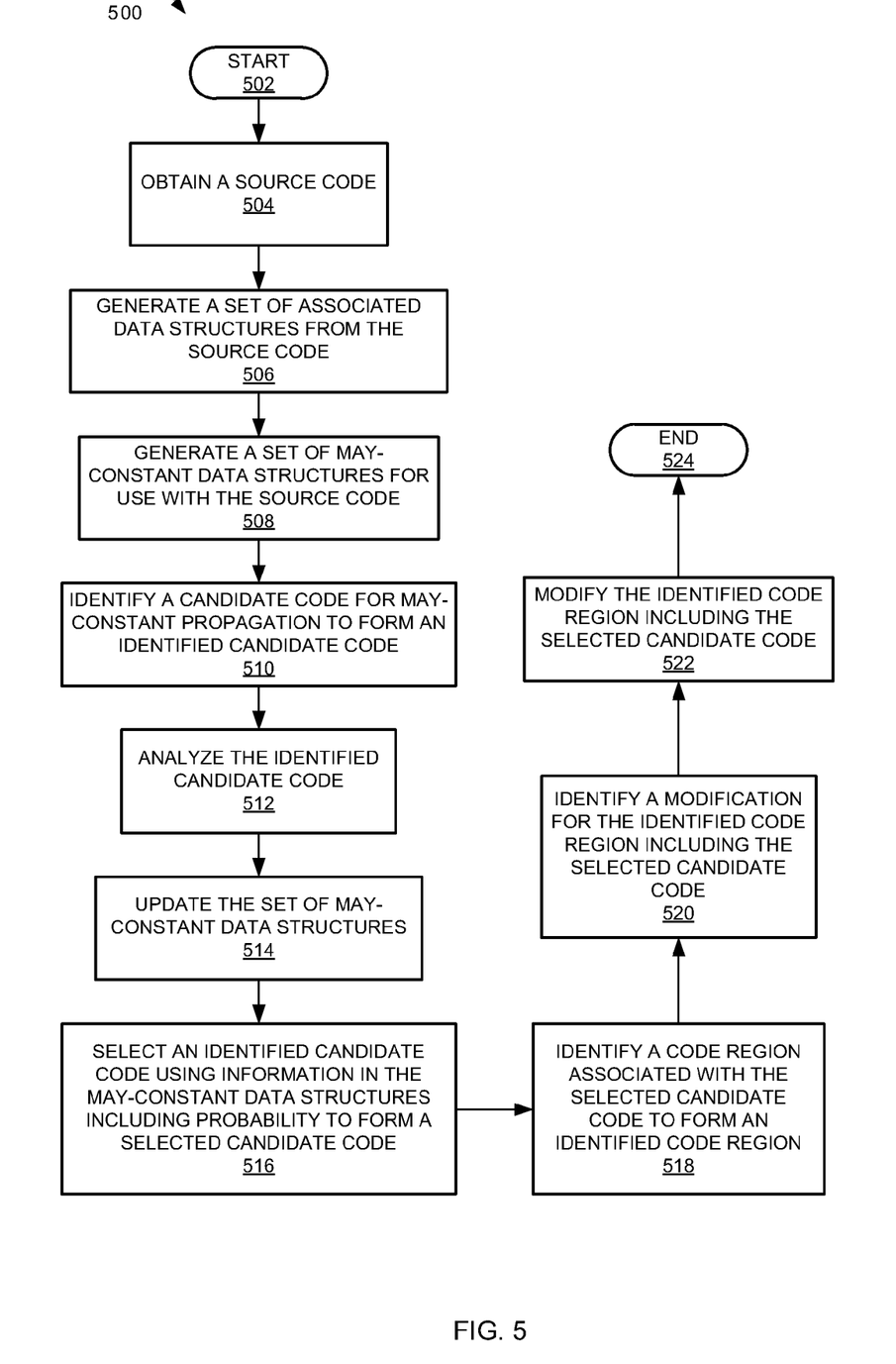
FIG. 5 is a flowchart of a may-constant propagation process of the compilation system of FIG. 4, in accordance with an embodiment of the disclosure.

With reference to FIG. 5, a flowchart of a may-constant propagation process of the compilation system of FIG. 4, in accordance with one embodiment of the disclosure is presented. Process 500 is an example of a may-constant propagation process as used within compiler 402 of FIG. 4. Process 500 provides a capability to evaluate unknown constants in a more predictable manner. For example, the capabilities of process 500 are provided through code analysis and speculative processing of a may-constant value according to an assigned probability and modify associated code to enhance the performance of the code including selected may-constant propagation candidates.

Process 500 starts (step 502) and obtains a source code (step 504). Source code is provided as input to the compiler in a form specific to the programming language in use. Having obtained a source code input process 500 generates a set of associated data structures from the source code (step 506). The set of associated data structures includes structures comprising a call graph that is typically generated for inter procedure propagation; while a control flow graph is used for inter procedure propagation. Additional structures including dominator and post-dominator trees as well as static single assignment (SSA) graph may be created from the source code input.

Generate a set of may-constant data structures for use with the source code is performed (step 508). The may-constant data structures as used in the previous illustrative embodiment include a global or universal may-constant table, a may-constant def table and a may-constant use table. The first two data structures include a probability value associated with each may-constant entry. Identify a candidate code for may-constant propagation to form an identified candidate code is performed (step 510). The candidate code is a portion of the previously obtained input. The portion may be a code segment comprising a function, a loop, a procedure, or a complete program or other block of related code.

Initially all code may be viewed as candidate code. Candidate code may be further refined to include code containing important variables, with a further focus on key variables. For example, in a loop instance an induction variable may be typically selected. In the previous example of the shaped array, variables associated with the size of shaping of the array would be of importance. Candidate code is determined by a number of factors including a probability value. Code having a higher probability value associated with a may-constant will be selected as a candidate over code having a lower probability value. A threshold value may be set for probability values to cause all "low" probability entries to be ignored. The selection of higher probability entries allows code modification to focus on fewer more important code segments or portions.

Process 500 then analyzes the identified candidate code (step 512). Code analysis is performed to update the set of may-constant data structures (step 514). Updates include updating of indices, offsets or other positional values that may have changed. The process 500 selects an identified candidate code using information in the may-constant data structures including probability to form a selected candidate code (step 516). Information from the may-constant data structures is used to refine the choices of candidates. For example, may-constants selected for processing may be ranked or selected according to probability values.

Having a selected candidate, the process 500 identifies a code region associated with the selected candidate code to form an identified code region (step 518). The process 500 identifies a modification for the identified code region including the selected candidate code (step 520). Modification choices typically include code versioning and cloning transformations. Modification of the identified code region including the selected candidate code is performed (step 522) with process 500 terminating thereafter (step 524). Typically modification includes transformation of the code region by code versioning or cloning as appropriate for the scope may-constant and of the code region.

Figure 6:
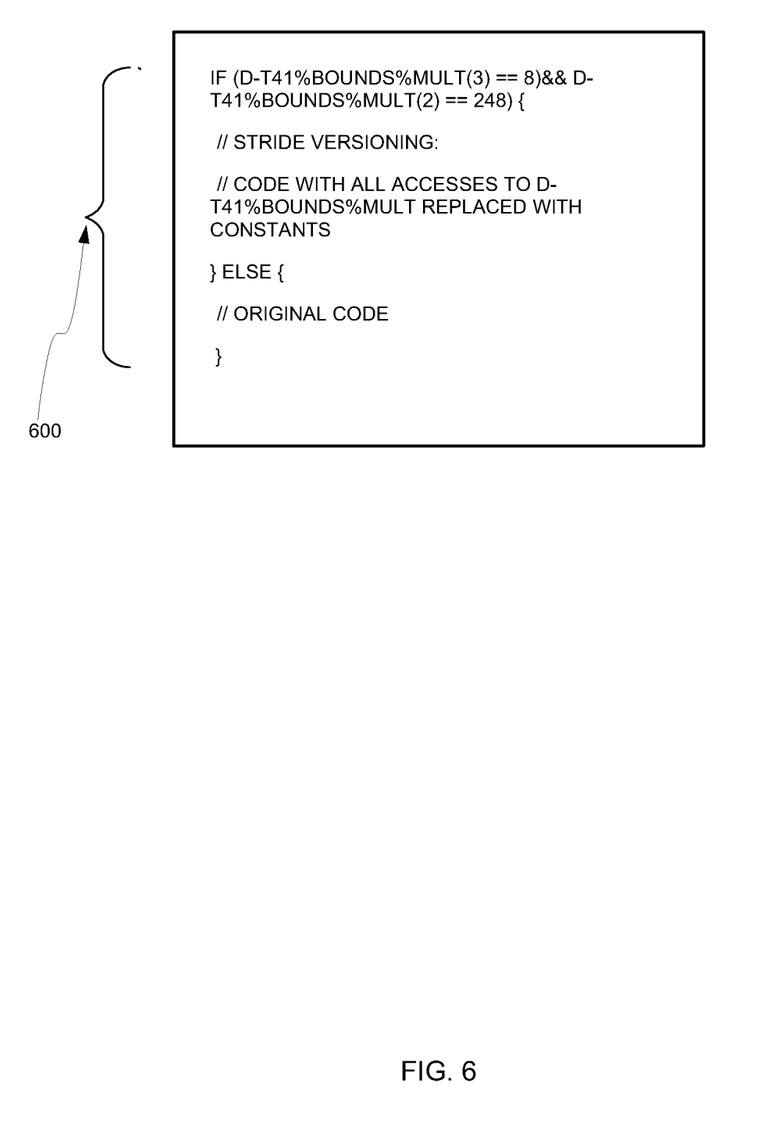
FIG. 6 is an illustrative representation of specialized code replacement for a portion of inter-procedure may-constant propagation of FIG. 2, in accordance with various embodiments of the disclosure.

With reference to FIG. 6, a textual representation of specialized code replacement for a portion of inter-procedure may-constant propagation of FIG. 2, in accordance with various embodiments of the disclosure is presented. FIG. 6 uses the example of code snippet 200 of FIG. 2 that represents a portion of computer executable program code or instructions that may be used in an inter-procedure may-constant propagation. Statements 202 may be shown to have a low probability of being executed. Statements 202 may be replaced as a result of using process 500 of FIG. 5.

The collection and analysis, code selection and modification provides code segment 600 as a replacement for statements 202 of FIG. 2. The resulting code segment 600 when combined with the remaining code of code snippet 200 of FIG. 2 comprises fewer statements and typically more predictable results.

Figure 7A:
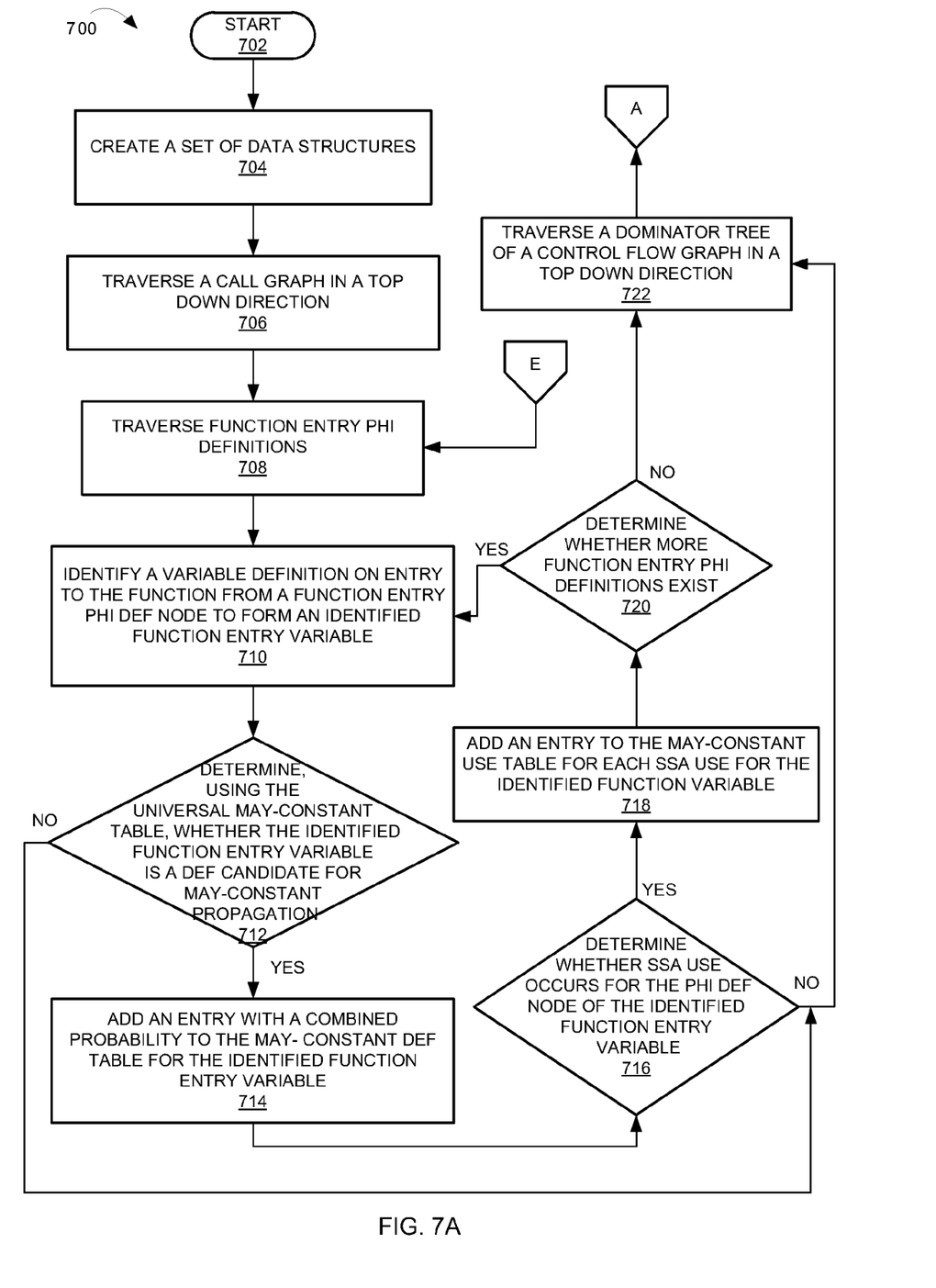
FIG. 7a, 7b, 7c are flowcharts of an analysis portion of the may-constant propagation process of FIG. 5, in accordance with an embodiment of the disclosure.
Figure 7B:
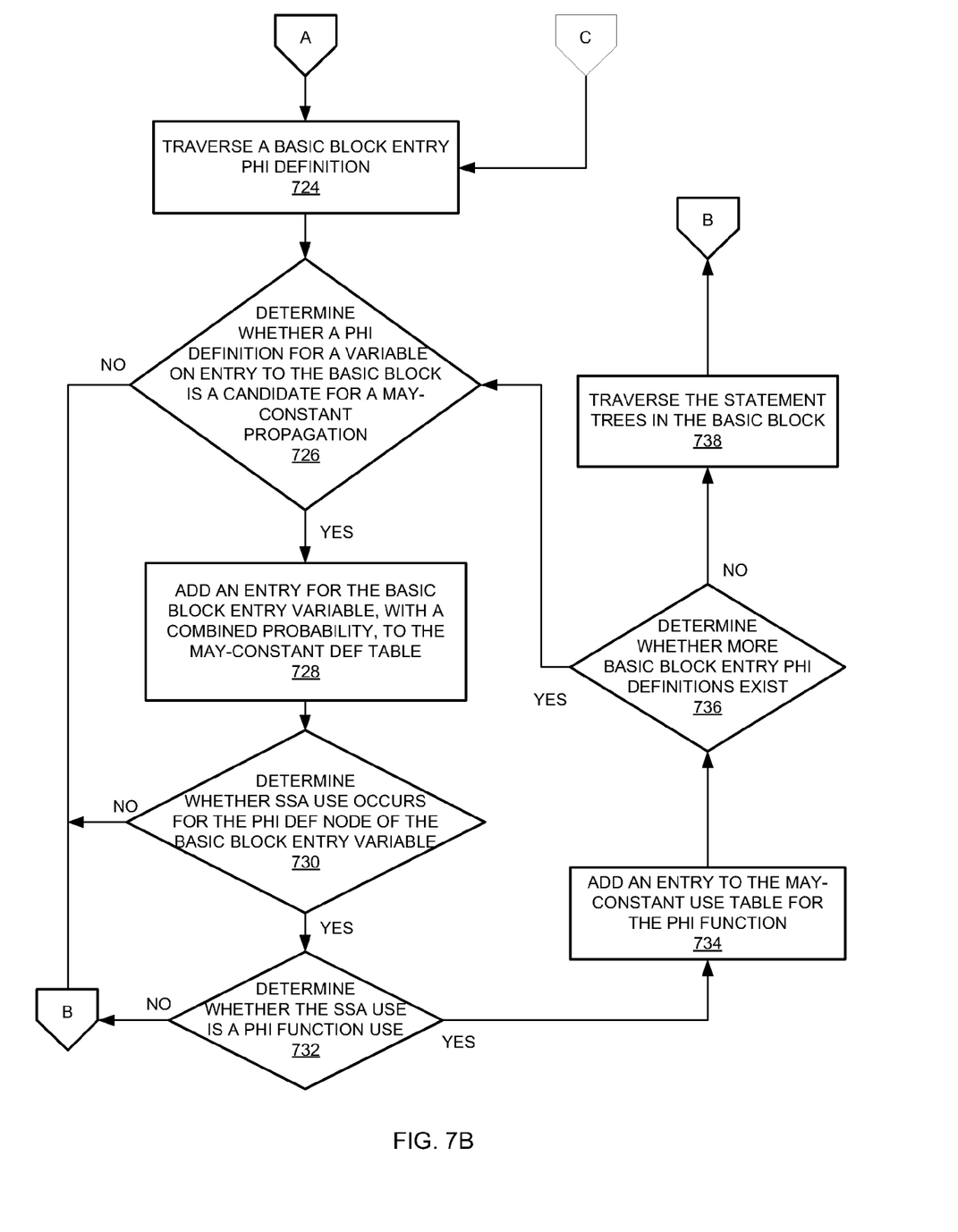
Figure 7C:
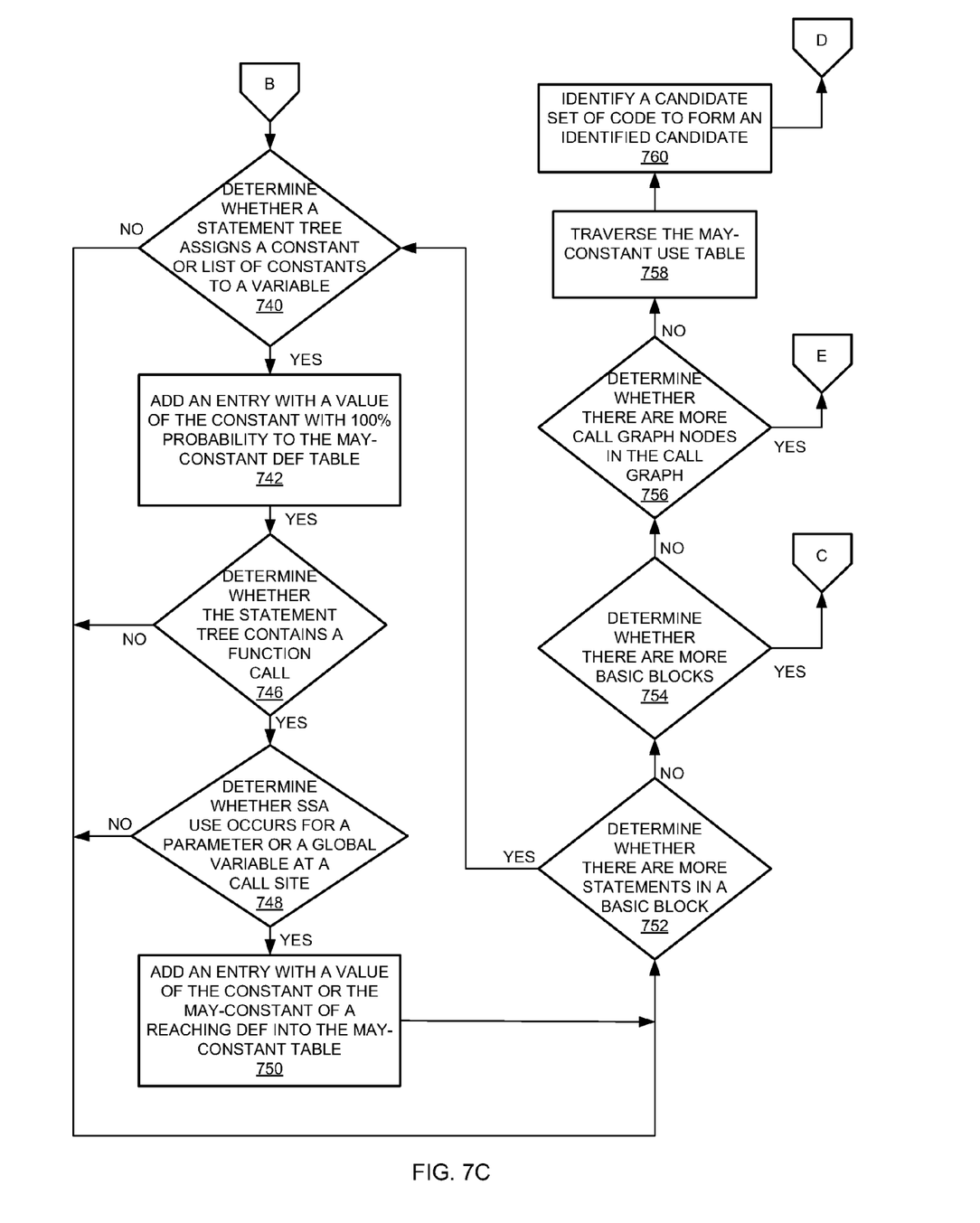

With reference to FIGS. 7a, 7b, and 7c, flowcharts of an analysis portion of the may-constant propagation process of FIG. 5, in accordance with an embodiment of the disclosure are presented. Process 700 represents a more detailed view of a code collection and analysis process within the overview provided in process 500 of FIG. 5.

In some instances, process 700 starts (step 702) and creates a set of data structures (step 704). The data structures typically represent structures used to collect information from the source code supplied as input. A set of structures including graphs and may-constant particular tables can be created as in the examples of FIG. 4. In this example the call graph is traversed in a top down order (step 706). The function entry PHI definitions are then traversed (step 708). On entry from a function entry PHI node a variable definition is identified to form an identified function entry variable (step 710). The PHI function is a set of one or more statements of a function, generated by the compiler, specifying a definition of a variable dependent on flow control at a location. Initialization of the values of parameters and global variables is performed on entry to the function. Upward exposed variables such as value parameters, reference parameters and global variables can be identified by function entry PHI nodes.

Process 700 determines, using the universal may-constant table, whether the identified function entry variable is a def candidate for may-constant propagation (step 712). The information in the universal may-constant table is used to analyze incoming call edges. When a determination is made that the identified function is a def candidate for may-constant propagation, a "yes" is obtained. When a determination is made that the identified function is not a def candidate for may-constant propagation, a "no" is obtained. When a "no" is obtained from step 712, process 700 skips ahead to step 722.

When a "yes" is obtained in step 712, add an entry with a combined probability to the may-constant def table (step 714). It is determined whether a static single assignment (SSA) use occurs for the PHI def node of the identified function entry variable (step 716). When no static single assignment use occurs a "no" result is obtained. When a static single assignment use occurs a "yes" result is obtained. When a "no" result is obtained in step 716, process 700 skips to step 722.

When a "yes" is obtained in step 716, an entry to the may-constant use table is added for each static single assignment use for the identified function entry variable (step 718). It is determined whether more function entry PHI definitions exist (step 720). When a determination is made that more function entry PHI definitions exist a "yes" result is obtained. When a determination is made that no more function entry PHI definitions exist a "no" result is obtained.

When a "yes" is obtained in step 720, process 700 loops back to perform step 710. When a "no" is obtained in step 720, traverse a dominator tree of a control flow graph in a top down direction is performed (step 722). The dominator tree is one of the data structures that were initialized when a set of data structures was created in step 704. The dominator tree comprises block entries for each PHI definition.

With reference to FIG. 7c, process 700 continues to traverse a basic block entry PHI definition (step 724). During the traversal an analysis of all reaching definitions of all PHI uses of the PHI definition is performed to determine whether a PHI definition for a variable on basic block entry to the basic block is a candidate for a may-constant propagation (step 726). When a determination is made that the PHI definition for a variable on basic block entry to the basic block is a candidate for a may-constant propagation a "yes" result is obtained. When a determination is made that the PHI definition for a variable on basic block entry to the basic block is not a candidate for a may-constant propagation a "no" result is obtained.

When a "no" result is obtained in step 726, process 700 skips to step 740. When a "yes" is obtained in step 726, add an entry for the basic block entry variable with a combined probability to the may-constant def table (step 728). It is determined whether a static single assignment (SSA) use occurs for the PHI def node of the basic block entry variable (step 730). When a determination is made that no static single assignment use occurs a "no" result is obtained. When a determination is made that a static single assignment use occurs a "yes" result is obtained. When a "no" result is obtained in step 730, process 700 skips to step 740. When a "yes" is obtained in step 730, it is determined whether the static single assignment (SSA) use is a PHI function use (step 732). When a determination is made that the static single assignment (SSA) use is a PHI function use a "yes" result is obtained. When a determination is made that the static single assignment (SSA) use is not a PHI function use, a "no" result occurs.

When a "no" result is obtained in step 732 process 700 skips to step 740. When a "yes" result occurs in step 732, add an entry to the may-constant use table for the PHI function (step 734). Process 700 determines whether more basic block entry PHI definitions exist (step 736). When a determination is made that more basic block entry PHI definitions exist, a "yes" result is obtained. When a determination is made that no more basic block entry PHI definitions exist, a "no" result is obtained. When a "no" result is obtained in step 736, process 700 loops back to perform step 726. When a "yes" is obtained in step 736, traverse the statement trees in the basic block is performed (step 738).

With reference to FIG. 7c, process 700 determines whether a statement tree assigns a constant or a list of constants to a variable (step 740). When a determination is made that a statement tree assigns a constant or a list of constants to a variable, a "yes" result is obtained. When a determination is made that a statement tree does not assign a constant or a list of constants to a variable, a "no" result is obtained.

When a "no" result is obtained in step 740, process 700 skips to step 752. When a "yes" is obtained in step 740, process 700 adds an entry with a value of the constant with 100 percent probability to the may-constant def table (step 742). It is determined whether the statement tree contains a function call (step 746). When the statement tree contains a function call a "yes" result is obtained. When the statement tree does not contain a function call, a "no" result is obtained. When a "no" result is obtained in step 746, process 700 skips to step 752.

When a "yes" result is obtained in step 740, it is determined whether static single assignment (SSA) use occurs for a parameter or a global variable at a call site (step 748). When a determination is made that a static single assignment (SSA) use occurs for a parameter or a global variable at a call site, a "yes" result is obtained. When a determination is made that a static single assignment (SSA) use does not occur for a parameter or a global variable at a call site, a "no" result is obtained. When a "no" result is obtained in step 748, process 700 skips to step 752. When a "yes" result is obtained in step 748, process 700 adds an entry with a value of the constant or the may-constant of a reaching def into the universal may-constant table (step 750).

Determine whether there are more statements in a basic block is performed (step 752). When a determination is made that there are more statements in a basic block, a "yes" result is obtained. When a determination is made that there are no more statements in a basic block, a "no" result is obtained. When a "yes" result is obtained in step 752, process 700 loops back to step 740 to process the remaining statements. When a "no" result is obtained in step 752, it is determined whether there are more basic blocks is performed (step 754). When a determination is made that there are more basic blocks, a "yes" result is obtained. When a determination is made that there are no more basic blocks, a "no" result is obtained. When a "yes" is obtained in step 754, process 700 loops back to step 724.

When a "no" is obtained in step 754, it is determined whether there are more call graph nodes in the call graph (step 756). When a determination is made that there are more call graph nodes in the call graph, a "yes" result is obtained. When a determination is made that there are no more call graph nodes in the call graph, a "no" result is obtained. When a "yes" result is obtained in step 756, process 700 loops back to step 708. When a "no" is obtained in step 756, traverse the may-constant use table is performed (step 758). Identify a candidate set of code to form an identified candidate is performed (step 760). The identified candidate is a portion of code including use of the may-constants.

Figure 7D:
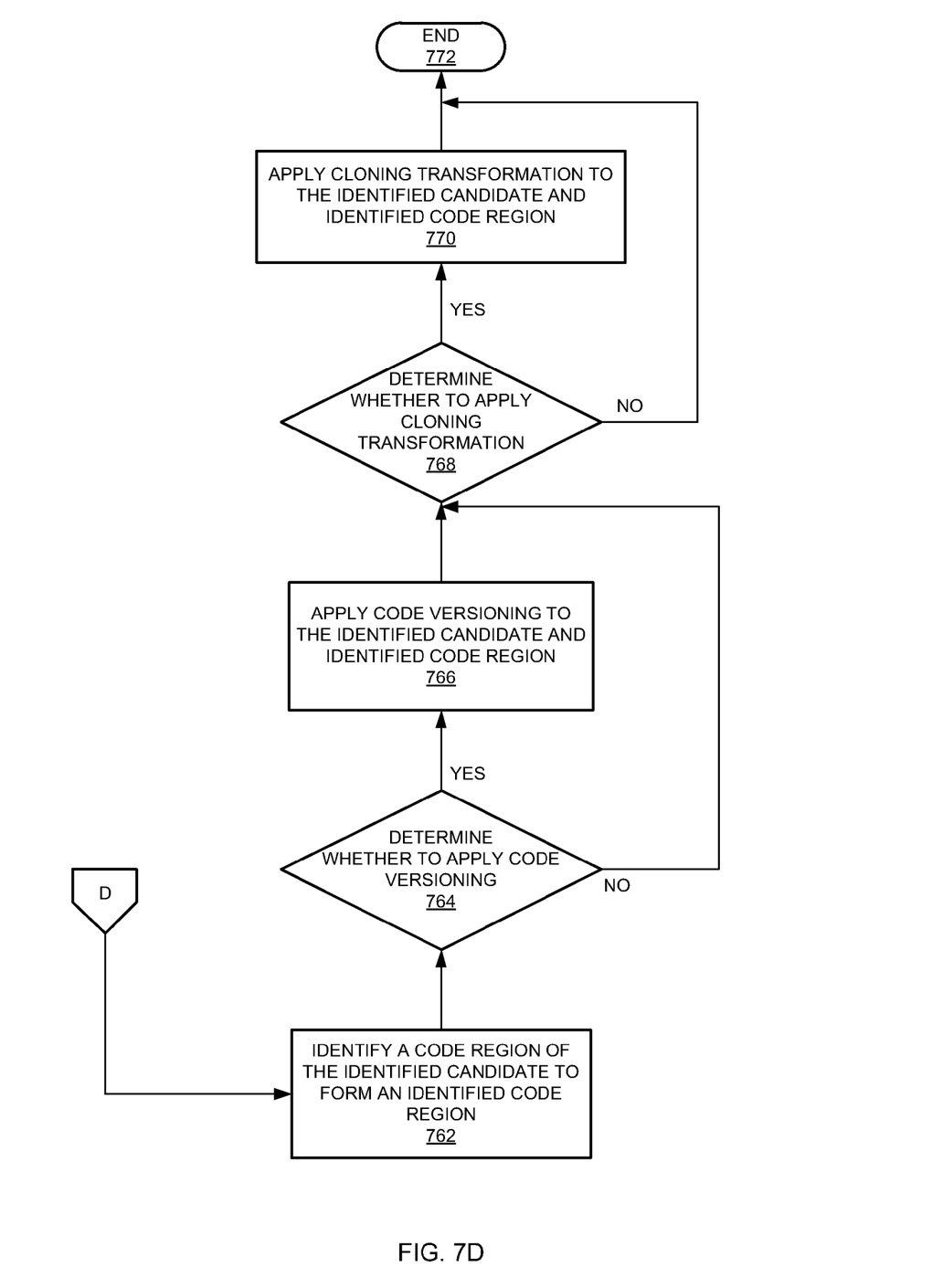
FIG. 7d is a flowchart of a code selection portion and a code transformation portion of the may-constant propagation process of FIG. 5, in accordance with an embodiment of the disclosure.

With reference to FIG. 7*d*, a flowchart of a code selection portion and a code transformation portion of the may-constant propagation process of FIG. 5, in accordance with an embodiment of the disclosure is presented. FIG. 7*d* is also a continuation of the process 700 of FIG. 7*c*.

Candidates as previously described include variables or constants of interest or deemed to be important. Continuing from step 760 of FIG. 7*c*, process 700 performs identify a code region of the identified candidate to form an identified code region (step 762). The code region is associated with or contains the identified candidate code. The region may comprise a function, a procedure or a program or portions thereof. Having identified the code region, determine whether to apply code versioning (step 764). Code versioning is typically applied to regions such as a version of a loop. When a determination is made to apply code versioning a "yes" is obtained. When a determination is made to not apply code versioning a "no" result is obtained. When a "no" result is obtained in step 764, process 700 skips to step 768. When a "yes" result is obtained in step 764, apply code versioning to the identified candidate and identified code region (step 766). Determine whether to apply cloning transformation is performed (step 768).

When a determination is made to apply cloning transformation, a "yes" result is obtained. When a determination is made to not apply cloning transformation, a "no" result is obtained. When a "no" is obtained in step 768, process 700 terminates (step 772). When a "yes" result is obtained, apply cloning transformation to the identified candidate and identified code region is performed (step 770) with process 700 terminating thereafter (step 772). Cloning transformation is typically applied to a whole procedure.

Operations 704 through 756 are representative of data structure creation and node analysis elements 408 through 418 of FIG. 4. Operations 760 and 762 are representative of code selector 426 of FIG. 4. Operations 764 through 770 are representative of code modifier 428 of FIG. 4.

An illustrative embodiment thus provides a capability in the form of a computer-implemented process for may-constant propagation that uses information in may-constant data structures including probability information to aid in selection of candidates for may-constant propagation. The computer-implemented process obtains a source code, and generates a set of associated data structures from the source code and a set of may-constant data structures. The computer-implemented process identifies a candidate code for may-constant propagation to form identified candidate code, updates the set of may-constant data structures, and selects an identified candidate code using information in the may-constant data structures, including probability, to form a selected candidate code. The computer-implemented process further identifies a code region associated with the selected candidate code to form an identified code region and modifies the identified code region including the selected candidate code.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques for may-constant propagation as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for propagating may-constants in program code input to a compiler comprising:
   determining variables that may be associated with a set of one or more constants in the program code;
   calculating execution flow probabilities for a set of one or more code segments of the program code that associate the variables with the set of one or more constants, wherein the execution flow probabilities are calculated based, at least in part, on flow data for the program code;
   determining that at least a first code segment of the set of one or more code segments has a first of the execution flow probabilities that exceeds a threshold, wherein the first code segment at least associates a first variable of the variables with a first of the set of one or more constants;
   propagating the first of the set of one or more constants associated with the first variable through the flow data to generate modified flow data based, at least in part, on said determining that at least the first code segment of the set of one or more code segments has a first of the execution flow probabilities that is high.

2. The method of claim 1 further comprising generating executable code with the modified flow data.

3. The method of claim 1, wherein said calculating the execution flow probabilities for the set of one or more code segments of the program code that comprise the variables comprises is based, at least in part, on branch predicting.

4. The method of claim 1 further comprising instrumenting the program code, wherein said calculating the execution flow probabilities for the set of one or more code segments of the program code that comprise the variables is based, at least in part, on said instrumenting the program code.

5. The method of claim 4, wherein said instrumenting comprises at least one of execution tracing and code profiling.

6. The method of claim 1, wherein said propagating the first of the set of one or more constants associated with the first variable through the flow data to generate the modified flow data comprises ignoring possible kills and re-definitions of the first variable in the first of the set of one or more code segments having low ones of the execution flow probabilities.

7. The method of claim 1, wherein said data flow comprises at least one of inter-procedure flow data and intra-procedure flow data.

8. The method of claim 1, wherein the flow data comprises call graph data and control flow graph data.

9. The method of claim 8, wherein said propagating the first of the set of one or more constants associated with the first variable through the flow data to generate the modified flow data comprises modifying the call graph data and the control flow graph data to propagate the first of the set of one or more constants associated with the first variable.

10. The method of claim 1 further comprising performing at least one of code versioning and cloning with the modified flow data.

11. A computer program product for may-constant propagation in a data processing system, the computer program product comprising:

a computer readable storage medium having computer usable program code embodied therewith, the computer usable program code configured to, determine variables that may be associated with a set of one or more constants in the program code;

calculate execution flow probabilities for a set of one or more code segments of the program code that associate the variables with the set of one or more constants, wherein the execution flow probabilities are calculated based, at least in part, on flow data for the program code;

determine that at least a first code segment of the set of one or more code segments has a first of the execution flow probabilities that exceeds a threshold, wherein the first code segment at least associates a first variable of the variables to a first of the set of one or more constants;

propagate the first of the set of one or more constants associated with the first variable through the flow data to generate modified flow data based, at least in part, on determining that at least the first code segment of the set of one or more code segments has a first of the execution flow probabilities that is high.

12. The computer program product of claim 11, wherein the flow data comprises call graph data and control flow graph data.

13. The computer program product of claim 12, wherein the computer usable program code being configured to propagate the first of the set of one or more constants associated with the first variable through the flow data to generate the modified flow data comprises the computer usable program code being configured to modify the call graph data and the control flow graph data to propagate the first of the set of one or more constants associated with the first variable.

14. The computer program product of claim 11 further comprising computer usable program code configured to perform at least one of code versioning and cloning with the modified flow data.

15. The computer program product of claim 11, wherein the computer usable program code being configured to propagate the first of the set of one or more constants associated with the first variable through the flow data to generate the modified flow data comprises the computer usable program code being configured to ignore possible kills and re-definitions of the first variable in the first of the set of one or more code segments having low ones of the execution flow probabilities.

16. The computer program product of claim 11, wherein the computer usable program code is further configured to generate executable code with the modified flow data.

17. A data processing system comprising:

a processor; and a computer readable storage medium having a compiler embodied therein, the compiler being configured to:

determine variables that may be associated with a set of one or more constants in the program code;

calculate execution flow probabilities for a set of one or more code segments of the program code that associate the variables with the set of one or more constants, wherein the execution flow probabilities are calculated based, at least in part, on flow data for the program code;

determine that at least a first code segment of the set of one or more code segments has a first of the execution flow probabilities that exceeds a threshold, wherein the first code segment at least associates a first variable of the variables to a first of the set of one or more constants;

propagate the first of the set of one or more constants associated with the first variable through the flow data to generate modified flow data based, at least in part, on determining that at least the first code segment of the set of one or more code segments has a first of the execution flow probabilities that is high.

18. The data processing system of claim 17, wherein the flow data comprises call graph data and control flow graph data.

19. The data processing system of claim 18, wherein the compiler being configured to propagate the first of the set of one or more constants associated with the first variable through the flow data to generate the modified flow data comprises the compiler being configured to modify the call graph data and the control flow graph data to propagate the first of the set of one or more constants associated with the first variable.

* * * * *